США011441932B2

United States Patent
Kroemer

(10) Patent No.: US 11,441,932 B2
(45) Date of Patent: Sep. 13, 2022

(54) METHOD FOR MONITORING THE OPERATION OF A FLUID METER AND FLUID METER

(71) Applicant: DIEHL METERING GMBH, Ansbach (DE)

(72) Inventor: Harald Kroemer, Ansbach (DE)

(73) Assignee: Diehl Metering GmbH, Ansbach (DE)

( * ) Notice: Subject to any disclaimer, the term of this patent is extended or adjusted under 35 U.S.C. 154(b) by 176 days.

(21) Appl. No.: 16/893,668

(22) Filed: Jun. 5, 2020

(65) Prior Publication Data

US 2020/0300679 A1 Sep. 24, 2020

Related U.S. Application Data

(63) Continuation of application No. PCT/EP2018/082842, filed on Nov. 28, 2018.

(30) Foreign Application Priority Data

Dec. 5, 2017 (DE) .............................. 102017011201

(51) Int. Cl.
*G01F 1/66* (2022.01)
*G01F 1/667* (2022.01)

(52) U.S. Cl.
CPC .............. *G01F 1/667* (2013.01); *G01F 1/662* (2013.01)

(58) Field of Classification Search
None
See application file for complete search history.

(56) References Cited

U.S. PATENT DOCUMENTS

| 6,950,768 | B2* | 9/2005 | Freund, Jr. ................ | G01F 1/72 |
| | | | | 702/89 |
| 7,290,450 | B2* | 11/2007 | Brown .................... | G01F 1/666 |
| | | | | 73/579 |
| 10,379,084 | B2 | 8/2019 | Nielsen et al. | |
| 2005/0011278 | A1 | 1/2005 | Brown et al. | |
| 2005/0055171 | A1* | 3/2005 | Freund .................... | G01F 1/667 |
| | | | | 702/89 |
| 2010/0084034 | A1* | 4/2010 | Sonnenberg ............ | G01F 15/00 |
| | | | | 138/39 |
| 2010/0192703 | A1 | 8/2010 | Huang et al. | |
| 2013/0080081 | A1* | 3/2013 | Dugger ................... | G01F 1/662 |
| | | | | 702/48 |
| 2014/0012518 | A1* | 1/2014 | Ramamurthy .......... | G01F 1/668 |
| | | | | 702/48 |

(Continued)

FOREIGN PATENT DOCUMENTS

| EP | 3112820 A1 | 1/2017 |
| EP | 3112823 A1 | 1/2017 |

*Primary Examiner* — Harshad R Patel
(74) *Attorney, Agent, or Firm* — Laurence A. Greenberg; Werner H. Stemer; Ralph E. Locher

(57) ABSTRACT

A method monitors an operation of a fluid meter mounted in a fluid-supplying fluid distribution system. Wherein, by use of an ultrasonic transducer, an event, in the form of a noise generated during the operation of the fluid meter or a pressure surge generated in the distribution system, which is not attributable to the flow measurement and which mechanically excites the ultrasonic transducer, is selectively detected and evaluated and, by reference to a result of the evaluation, at least one fluid meter-specific operating property is generated.

14 Claims, 6 Drawing Sheets

(56) References Cited

U.S. PATENT DOCUMENTS

| | | | |
|---|---|---|---|
| 2015/0211905 A1* | 7/2015 | Drachmann | H04R 31/006 |
| | | | 73/861.28 |
| 2016/0320228 A1* | 11/2016 | Hudson | G01F 1/66 |
| 2017/0307466 A1* | 10/2017 | Brennan, Jr. | G01M 3/2807 |
| 2018/0188210 A1 | 7/2018 | Nielsen et al. | |
| 2018/0274957 A1* | 9/2018 | Dabak | H04B 11/00 |
| 2018/0306617 A1* | 10/2018 | Bonomi | G01F 1/662 |
| 2019/0033261 A1 | 6/2019 | Nielsen et al. | |
| 2020/0240820 A1* | 7/2020 | Boerhout | G01F 15/066 |

\* cited by examiner

METHOD FOR MONITORING THE OPERATION OF A FLUID METER AND FLUID METER

CROSS-REFERENCE TO RELATED APPLICATION

This is a continuation application, under 35 U.S.C. § 120, of copending international application No. PCT/EP2018/082842, filed Nov. 28, 2018, which designated the United States; this application also claims the priority, under 35 U.S.C. § 119, of German patent application No. 10 2017 011 201, filed Dec. 5, 2017; the prior applications are herewith incorporated by reference in their entirety.

BACKGROUND OF THE INVENTION

Field of the Invention

The present invention relates, firstly to a method for monitoring the operation of a fluid meter mounted in a fluid-supplying fluid distribution system, e.g. a water distribution system, and secondly to a fluid meter.

Fluid meters are employed, for example, as water meters for the determination of the flow volume of water or drinking water consumption in households or businesses, or as heat meters for the determination of the consumption of thermal energy.

The determination of flow volume can be executed mechanically (e.g. in a paddle wheel water meter), by magnetic induction, or by an ultrasonic measuring system. The operating method of an ultrasonic fluid meter is based upon the employment of ultrasonic transducers having piezoelectric ultrasonic transducer elements. In general, two ultrasonic transducers constitute an ultrasonic transducer pair, having a measuring path arranged between the ultrasonic transducers. Ultrasonic waves or ultrasonic signals are directed along the measuring path, specifically in the form of "ultrasonic bursts" which are respectively transmitted or received by the ultrasonic transducers.

Determination of the flow volume of a fluid using an ultrasonic measuring system is generally executed by reference to a transit time difference measurement of ultrasonic signals. The transit time difference is determined wherein, firstly, an ultrasonic signal is transmitted from a first ultrasonic transducer to a second ultrasonic transducer in the direction of flow along the measuring path. Thereafter, an ultrasonic signal is transmitted from the second ultrasonic transducer back to the first ultrasonic transducer along the measuring path, conversely to the direction of flow. The transit time of the ultrasonic signal from one ultrasonic transducer to the other ultrasonic transducer along the measuring path in the direction of flow of the fluid is shorter than in the converse direction to the direction of flow of the fluid. This time difference in the transit times of the ultrasonic signals is described as the transit time difference or the transit time differential of the ultrasonic signals. By reference to this transit time difference and the known dimension of the ultrasonic fluid meter, the throughflow or volume of fluid can be determined by a computing, control and/or evaluation unit. Fluid meters incorporate an independent energy supply in the form of a battery.

Increasingly stringent demands are placed upon flow measurement. Specifically, endeavors are directed towards the extension of the measuring range of the fluid meter and the improvement of measuring accuracy. In this regard, the dependency of measuring accuracy and measuring dynamics upon various physical parameters and circumstances, such as fluid pressure, fluid temperature, interference factors, contamination, installation faults, component damage and component tolerances is of key significance. Influences which adversely affect the impeccable operation of a fluid meter also have a negative impact upon measuring accuracy. In consideration of the latter, it is necessary for a fluid meter to operate as impeccably as possible.

Interference factors in the operation of a fluid meter specifically include pressure surges, cavitation, contamination, installation errors, etc. Cavitation involves the constitution and release of vapor bubbles in the fluid associated with varying pressure conditions in the interior of the fluid meter at high throughflow speeds. Regions of a fluid meter which are particularly susceptible to cavitation are those regions in which the flow of fluid is diverted by structural features or routed through bottlenecks such that, at high flow speeds, regions of fluid-related low pressure are constituted, in which cavitation can occur. Cavitation can also be caused by foreign bodies which are situated in the fluid meter, which originate from the fluid system. Cavitation can also be caused by installation errors. Cavitation can also originate from very high non-regulation flow rates, which lie outside the specification for a fluid meter.

Firstly, cavitation is responsible for a corruption of the measurement result for the determination of flow volume, or even potentially for the total invalidation of the measurement result and, secondly, particularly if it occurs over a long period, cavitation can even result in component damage. Such component damage would also corrupt the measurement results, and would thus be responsible for measuring inaccuracies.

From published, European patent application EP 3 112 820 A1, corresponding to U.S. Pat. No. 10,379,084 and U.S. patent publication Nos. 2018/0188210 and 2019/033261, an ultrasonic flow meter having a noise sensor is known, by which leaks associated with the failure of pipes in a fluid distribution system are detected. By means of the reception of such a noise by a plurality of meters arranged in the fluid distribution system, the location of the leak in the fluid distribution system is determined. For the location of leak noise in the fluid distribution system, it is necessary for reception signals from a plurality of fluid meters situated at different points in the fluid distribution system to be evaluated. For the reception of leak noise, either an additional ultrasonic transducer can be provided in the fluid meter, or an ultrasonic transducer which is already employed for transit time measurement is additionally employed for the determination of noise.

A system is known from published, European patent application EP 3 112 823 A1, corresponding to U.S. Pat. No. 10,379,084 and U.S. patent publication Nos. 2018/0188210 and 2019/033261, for the monitoring of a fluid system using a plurality of fluid meters, which are equipped with an above-mentioned noise sensor.

SUMMARY OF THE INVENTION

The object of the present invention is the provision of a method for monitoring the operation of a fluid meter, by which the measuring accuracy and measuring stability of the fluid meter can be improved, in comparison with existing fluid meters. A further object of the present invention is the provision of a corresponding fluid meter.

The present object is fulfilled by the characteristics of the independent claim or of the sub-claims. Appropriate configurations of the method or the fluid meter according to the invention are claimed in the dependent claims.

According to the concept of the invention, the operation of the fluid meter is monitored by reference to an event which involves the mechanical excitation of the ultrasonic transducer, which is not attributable to the flow measurement, in the form of an internally occurring noise associated with the operation of the fluid meter and/or a pressure surge originating from the fluid system, and the distinction of such a signal from the signal associated with normal operation by selective detection and evaluation. The method according to the invention thus permits malfunctions in the fluid meter to be detected, evaluated and considered in the monitoring of the individual fluid meter, thus permitting, by reference to the result of this evaluation, at least one fluid meter-specific operating property to be detected. As a result, for example, installation errors such as e.g. a seal which has been displaced upon installation, a foreign body lodged in the meter, measuring periods with impaired measuring accuracy, or even measuring periods with no flow detection, can be reliably detected, documented and/or remedied.

Preferably, selectively detected events associated with the operation of the fluid meter are totalized over a time t to give an event duration, preferably a total event duration D, and/or an event intensity, preferably a total event intensity I, and logged in the fluid meter. This permits a continuous monitoring of the damaging influence upon the fluid meter, and thus an estimation of its integrity.

Preferably, a device-specific event history can also be constituted from the signals detected over time t, and retrieved or indicated as required.

Moreover, a detected event and/or device-specific information and/or the device-specific event history can be compared with an empirically determined event characteristic curve and/or event characteristic variables for the fluid meter, and a control variable and/or regulating variable deduced from this comparison.

The method according to the invention, in the event of an overshoot of a specified event duration D and/or of an event intensity I, specifically permits the generation of a warning signal and/or a warning message.

Preferably, in the event of a pressure surge, the maximum intensity thereof is detected and evaluated. For example, in the event of the detection of a pressure surge which exceeds a specific order or magnitude (amplitude), it can be inferred therefrom, by way of a fluid meter-specific operating property, that this fluid meter will have been destroyed, or that the measuring accuracy thereof will have been permanently and adversely impaired.

By the alternating operation of a control and evaluation device of the fluid meter in an active mode and a sleep mode, and by set-up of the control and evaluation device such that a switchover of the control and evaluation device from the sleep mode to the active mode is executed by reference to an electrical signal which is generated by the ultrasonic transducer in response to an event or a noise, the independent energy source of the fluid meter can be substantially preserved, notwithstanding the monitoring of operation. Accordingly, the control and monitoring device is only "activated" if a "characteristic malfunction event" or noise, which originates from the fluid meter itself, is actually present, or a characteristic malfunctional pressure surge has occurred on the ultrasonic transducer.

Appropriately, the electrical signal is a specified signal level (minimum signal level), a signal pattern and/or a specific frequency spectrum. Typical malfunction events can be empirically detected, digitized and "saved" in the control and evaluation device, in order to permit the execution of a comparison and a rapid classification. A typical "malfunction noise" in the event of cavitation, e.g. associated with a very high and non-regulation throughflow, the projection of seals into the interior of the pipe, or objects, e.g. stones, lodged in the interior of the pipe, which restrict the flow cross-section, is an aperiodic noise signal with a very broad spectrum. A typical "malfunction noise" in the event of a pressure surge, e.g. associated with the unintentional abrupt closure of a valve (shutter), conversely, is a sharply initiated voltage peak with a periodically decaying oscillation at a relatively low frequency.

It is particularly advantageous if the malfunction event is identified by a time stamp. It is thus possible to assign the occurrence of malfunctions to an exact time point or an exact time span. This, in turn, permits measurement results which encompass the time point or time span to be checked and, if necessary, corrected.

If an ultrasonic transducer which is employed in the context of an ultrasonic transducer assembly for the determination of transit time is additionally employed for the detection and evaluation of a malfunction noise, the present invention can even be implemented solely on the basis of existing components. Only the signal processing function will require corresponding adaptation.

The present invention further relates to a fluid meter according to the introductory clause of the independent fluid meter claim. For the fulfillment of the above-mentioned object, it is provided that the operating system, in addition to flow measurement, incorporates an additional functional mode, wherein the ultrasonic transducer selectively detects and evaluates an event which mechanically excites the ultrasonic transducer, in the form of a noise occurring in the fluid meter and/or in the form of a pressure surge.

In the context of the operation of the electronic module, the malfunction event, which can preferably be identified by a time stamp (a real time stamp), is saved and/or delivered as an output. If required, the event can also be transmitted to a superordinate data collection device (concentrator or data collector) via an appropriate communication link, e.g. a radio link. The transmission of data concerning the occurrence of malfunction events can be executed separately from consumption data, or in combination with the latter.

The flow meter according to the present invention is preferably of the type which contains a dedicated connection housing, by which the flow meter can be installed in the fluid system.

The flow meter preferably contains an insert, which respectively accommodates an ultrasonic transducer, and which projects somewhat into the measuring channel through an opening in the connection housing. In this type of construction, in the event of unforeseen rises in pressure, the unwanted occurrence of cavitation, or of malfunctions in general, can be observed.

In each case, the malfunction event is preferably an internal cavitation noise in the fluid meter and/or an internal vibration noise in the fluid meter and/or a pressure surge and/or a mechanical stress associated with particles conveyed in the fluid.

Other features which are considered as characteristic for the invention are set forth in the appended claims.

Although the invention is illustrated and described herein as embodied in a method for monitoring the operation of a fluid meter and a fluid meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
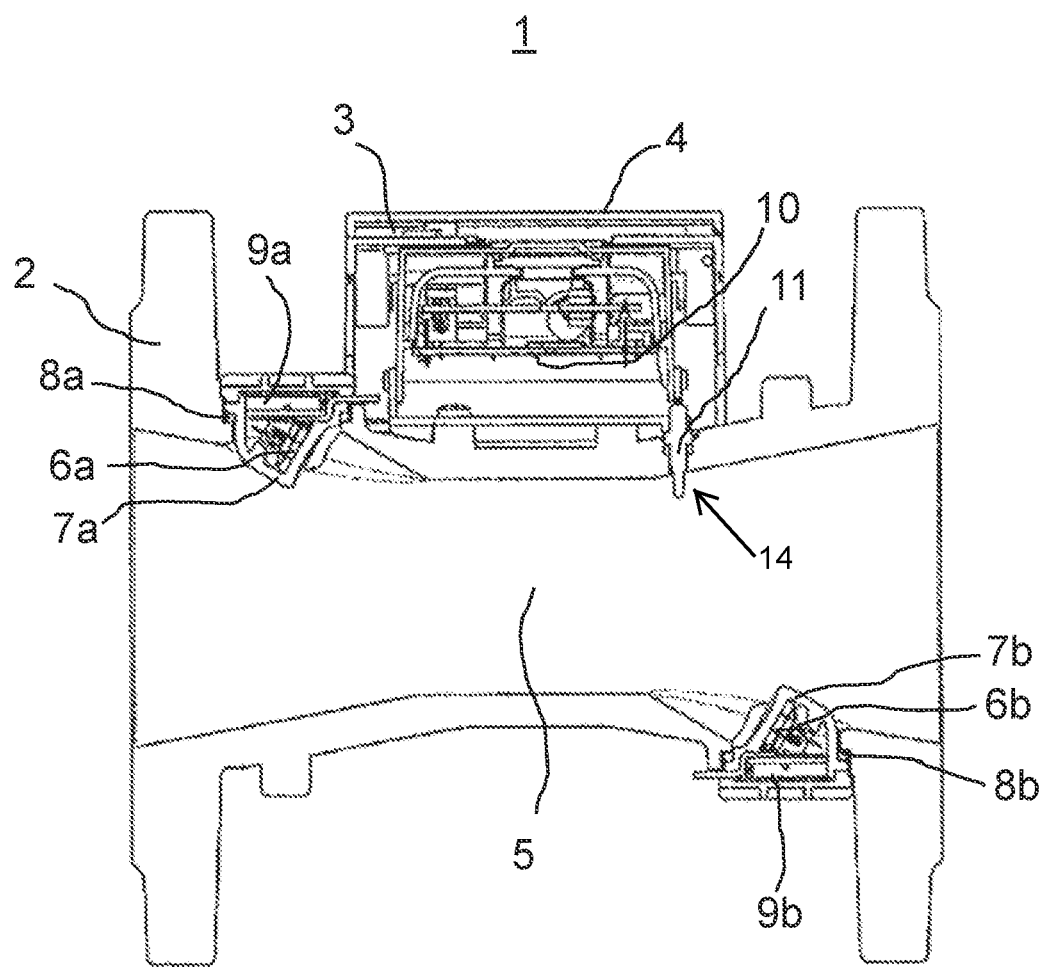
FIG. 1 is a diagrammatic, sectional view of a connection housing and a measuring insert of an ultrasonic flow meter according to the invention.

Referring now to the figures of the drawings in detail and first, particularly to FIG. 1 thereof, there is shown a fluid meter 1 which employs ultrasonic technology for a measurement of a flow volume of fluid e.g. water in a fluid distribution system. The fluid meter 1 contains a "connection housing" 2, by means of which the fluid meter 1 is installed in a pipe of the fluid distribution system (not represented in FIG. 1). On an upper side, an electronic module 3 is fitted, containing electronic components such as a control device (microprocessor), a display 4, a battery, a circuit board 10 and a memory. Preferably, the electronic module 3 can additionally incorporate a radio communication device for communication with a remotely located (unrepresented) data collector (concentrator).

The connection housing 2 contains, for example, two wall openings, in each of which an insert 7a, 7b comprised of a sound transmitting material (e.g. plastic) is inserted and sealed vis-à-vis the connection housing 2 by a seal 8a, 8b. On the inner wall of the respective insert 7a, 7b an ultrasonic transducer 6a, 6b is arranged in a fixed position for the transmission of an ultrasonic signal obliquely or diagonally through the wall of the respective insert 7a, 7b into a measuring channel 5 and thus to the opposing ultrasonic transducer 6b, or for the reception of an ultrasonic signal transmitted by the opposing ultrasonic transducer 6b. More than two wall openings can also be provided for more than two opposing ultrasonic transducers. The respective inserts 7a, 7b are closable by means of associated covers 9a, 9b. The ultrasonic transducers 6a, 6b are connected via signal paths to the electronic module 3. The fluid meter 1 according to FIG. 1, if required, can further be provided with a temperature sensor 11, which projects through a topside opening 14 into the interior of the connection housing 2, and is likewise connected via a signal path to the electronic module.

In normal operation, by means of the display 4, the fluid meter 1 indicates the respective fluid consumption, i.e. the volume of fluid flowing through the fluid meter 1. Fluid meters are customarily calibrated, and are protected against interference by means of a lead seal, or similar.

According to the present concept, at least one of the two ultrasonic transducers 6a, 6b is employed for the detection, selective recording and evaluation of dynamic noises associated with the operation of the fluid meter 1, and for the generation therefrom of a fluid meter-specific operating property. If, for example, the fluid meter 1 has been incorrectly installed, wherein part of a seal projects into the flow cross-section of the fluid meter 1, a turbulence region may be constituted in response to high flow rates, as a result of which cavitation can occur, which can be detected by the ultrasonic transducer in the form of a dynamic noise. The occurrence of cavitation can result in material erosion at surfaces and/or edges, such that the flow-carrying internal geometry of the ultrasonic transducer or of the measuring insert is altered over time, thus impairing the accuracy of measurement.

However, even in a correctly installed fluid meter 1, damaging cavitation can occur, for example in the event of an influx of fluid, e.g. water, into the connection housing 2 of the fluid meter 1 at an excessively high, i.e. a non-regulation pressure. Turbulence regions can thus be constituted, specifically around the inserts 7a, 7b, resulting in substantial cavitation. It can also be detected if a fluid meter, in the installed state, has inadvertently been inadequately secured, therefore resulting in vibrations during operation.

Additionally, at least one of the two ultrasonic transducers 6a, 6b can also be employed for the detection of a pressure surge in the fluid distribution network (e.g. associated with construction works or the malfunction of a throttling point), and the generation therefrom of a fluid meter-specific operating property.

A corresponding malfunction event can be detected by reference to a specific signal shape or by reference to a specific signal pattern.

Figure 2A:
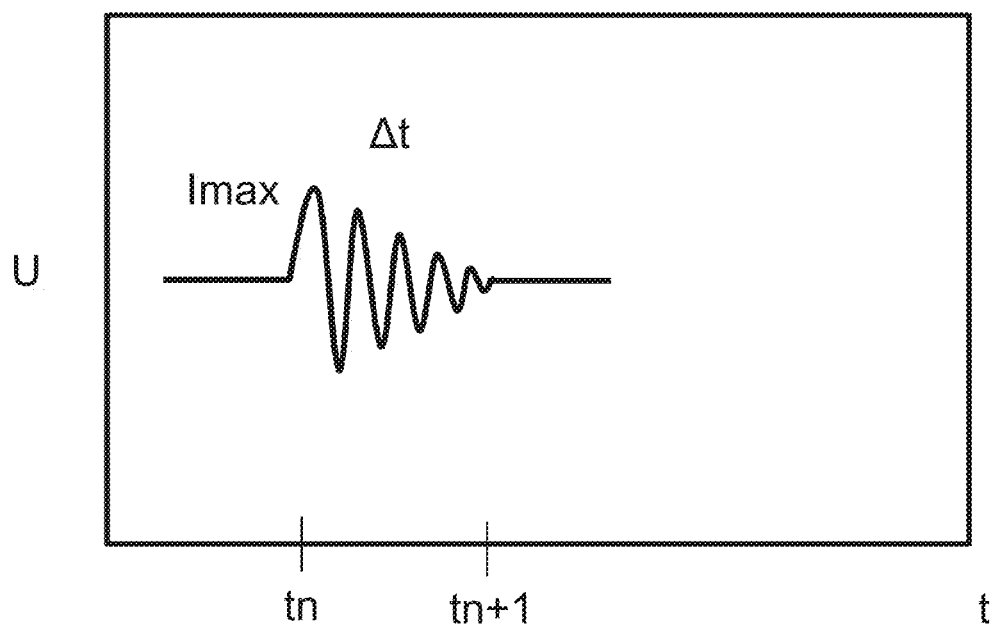
FIGS. 2A-2E are graphs showing various types of malfunction noises occurring in an operation of the fluid meter, in a highly simplified schematic representation.

FIG. 2A shows an exemplary signal shape for an abrupt voltage rise (to a maximum starting level Imax) at tn, and a periodic oscillation at a relatively low frequency, which decays over a given period of time Δt up to tn+1. From the signal shape, the signal frequency and/or the signal pattern, the nature of the malfunction can be concluded. The present example involves, e.g. a signal shape associated with the occurrence of a short-term rise in pressure (e.g. a pressure surge associated with an abruptly opened valve). The method according to the invention can also identify the exact time point and duration of the malfunction arising and/or the intensity thereof. Both tn and tn+1 are real time indicators, i.e. for the exact time of day of the occurrence of the malfunction and the exact time point of the termination thereof.

Additionally to the detection of voltage, detection of the signal frequency can also be executed.

Figure 2B:
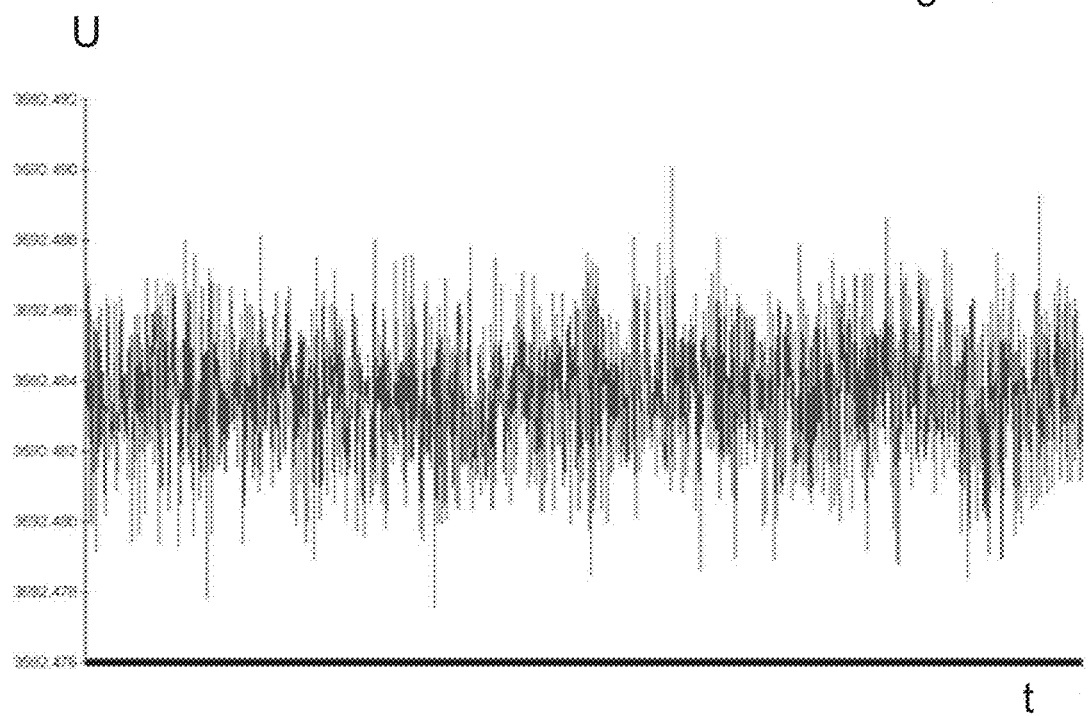

The signal shape or signal pattern according to FIG. 2B represents a characteristic cavitation signal. The signal corresponds to a strong noise with a broad and non-specific frequency spectrum and, in comparison with FIG. 2A, at a high frequency, associated e.g. with very high non-regulation flow rates, outside the fluid meter specification. In the event of such an incident, the correct detection of through-flow would no longer be guaranteed or, in the absence of a processable signal, would no longer be possible whatsoever.

Figure 2C:
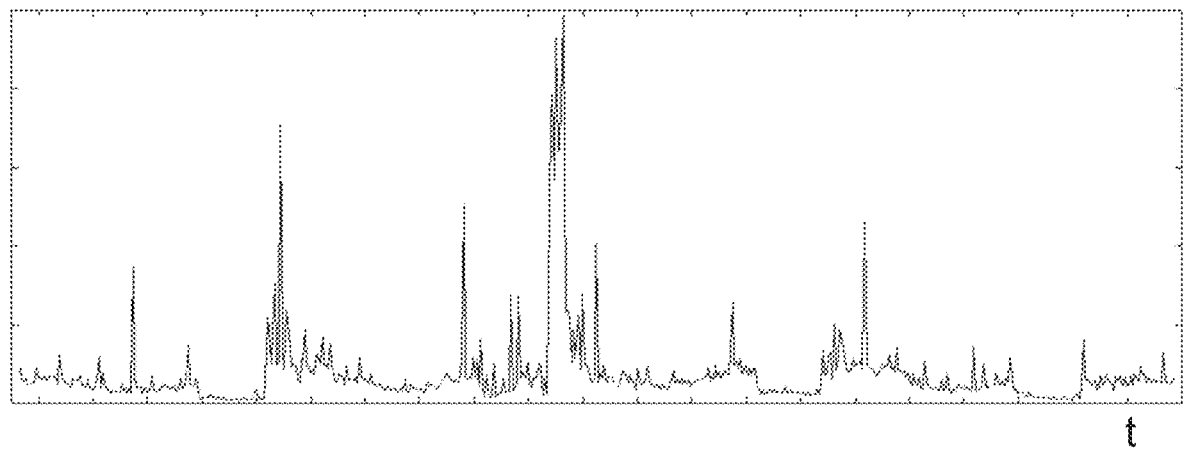

The signal shape or signal pattern according to FIG. 2C constitutes a characteristic curve with individual peaks of differing magnitude. A characteristic curve of this type indicates that particles of varying size (e.g. stones) are being flushed through the fluid meter, and the collision thereof with the surface of the insert which accommodates the ultrasonic transducer generates the signal pattern indicated.

Figure 2D:
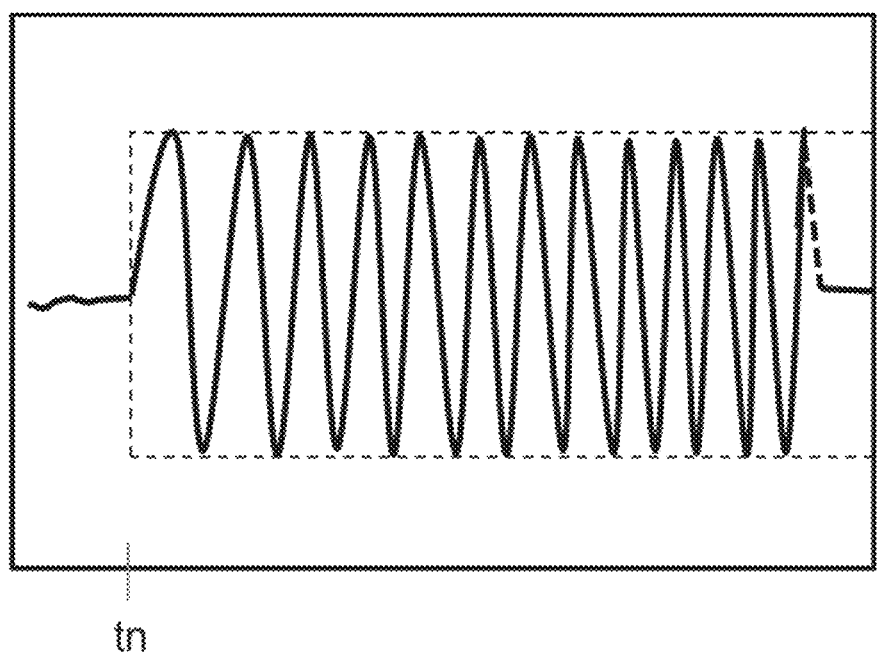

Periodic oscillations of greater and essentially consistent amplitude, c.f. FIG. 2D, can be attributed e.g. to a flow-related vibration associated with defective installation (e.g. defective attachment).

Corresponding (specifically, empirically determined) information, such as comparative signal shapes, comparative intensities, comparative frequencies and/or comparative time periods can be "saved" in the operating system of the fluid meter. Advantageously, a "type classification" of malfunction events can thus be executed on the basis of measured signals and, if necessary, control and/or warning measures implemented in response thereto. The electronics of the operating system can thus distinguish between simple signal noises, cavitation-specific signal noises, peaks associated with pressure surges and period oscillations associated with vibrations.

Figure 2E:
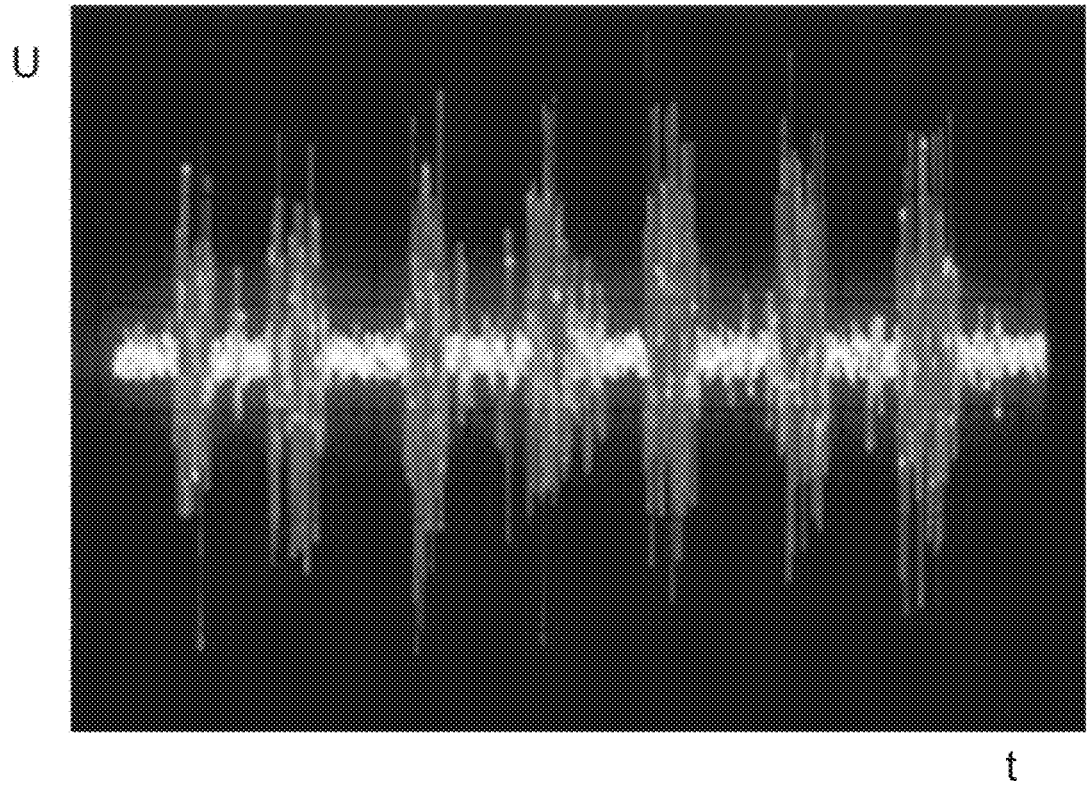

FIG. 2E shows an exemplary recurrent malfunction in the form of time-limited recurrent cavitation. The resulting characteristic curve shows two alternating flow rates of different magnitude, associated with the repeated occurrence of cavitation (the period of high amplitudes above the standard measuring range), as against the "normal flow rate" (the period of customary noise of low amplitudes, within the standard measuring range). In the regions of cavitation, on the grounds of poor signal quality, no transit time difference measurement is possible. In the period of low amplitude, conversely, the flow rate lies within the specification for the fluid meter, at which an exact flow measurement can be executed. The method according to the invention permits the accurate detection, location and documentation of time periods of reduced measuring accuracy, and the incorporation thereof in evaluation.

The respective electrical signal generated by an ultrasonic transducer in response to a noise is generated solely by the mechanical energy of the noise, with no additional energy.

Figure 4:
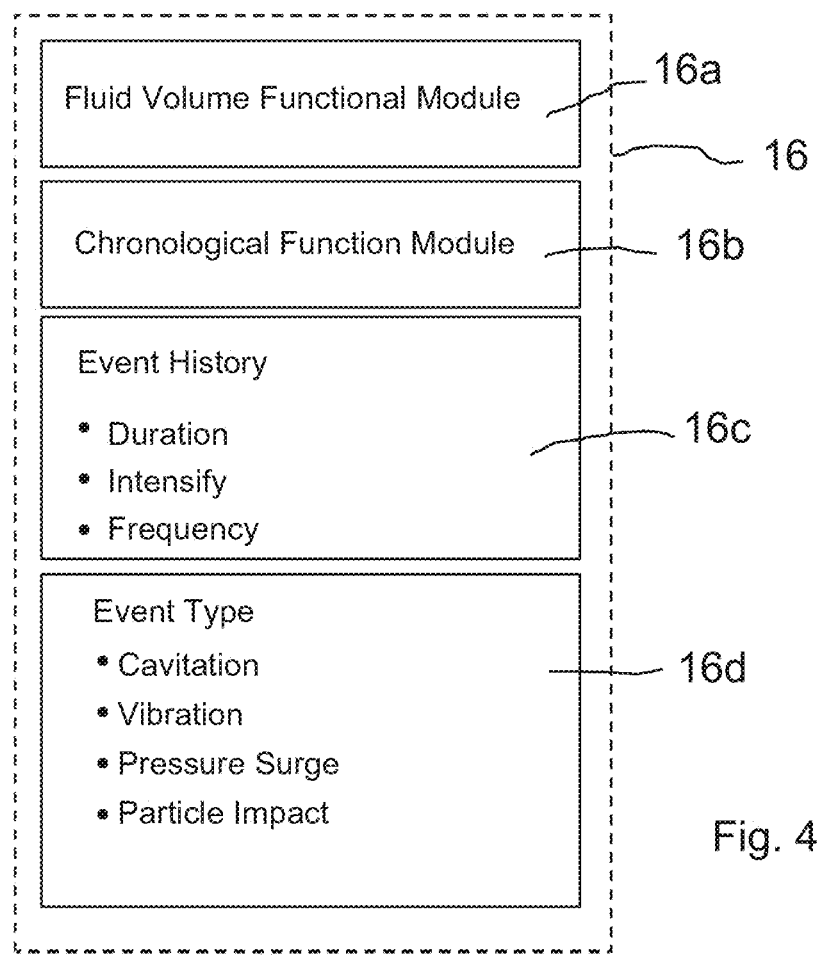
FIG. 4 is an illustration showing an example of an information output of the fluid meter according to the invention.

According to the present invention, in a fluid meter, c.f. e.g. FIG. 4, a plurality of functional modules are provided in the context of the operating program 16, namely, in addition to the fluid volume functional module 16a, an event chronology functional module 16b, and additionally, if required, further functional modules for the complete event history 16c and/or event type 16d.

In the context of the complete event history functional module 16c, the event duration D and/or the event intensity I and/or frequency can be saved and retrieved by way of data. In the case of the noise type functional module 16d, a distinction can be drawn, for example, between cavitation, vibration and/or overpressure (a pressure surge). The relevant information can preferably be indicated on the display 4 of the fluid meter 1 according to FIG. 1. Additionally, if required, warning signals and/or warning messages on the display can be generated as an output. Correspondingly, if required, corresponding event data, for the purposes of administration and/or further processing can also be transmitted to an (unrepresented) data collector and fed to a (likewise unrepresented) central unit.

Figure 3:
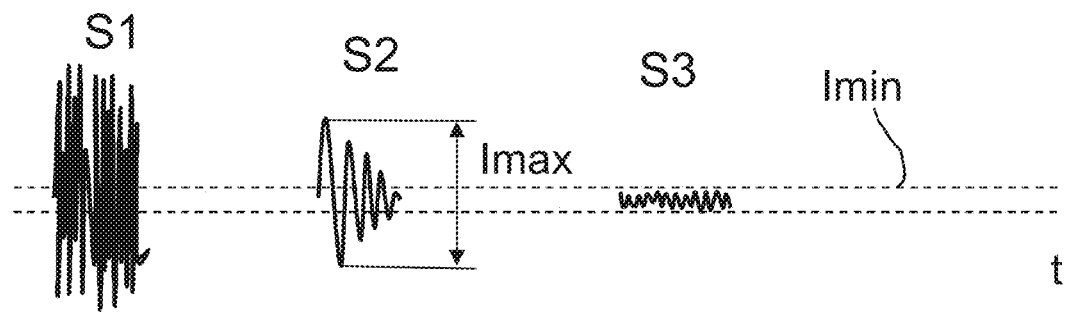
FIG. 3 is a graph showing a malfunction noise history of the fluid meter over time, in a highly simplified schematic representation.

According to the invention, as represented in FIG. 3, in the context of the method, a minimum intensity Imin can be stipulated, by means of which the presence of a signal resulting from a malfunction (S1, S2) can be distinguished from simple noise or the flow measurement (S3).

Operation of the control and evaluation device in the electronic module of the fluid meter alternates between an active mode and a sleep mode. To this end, the control and evaluation device is designed such that a switchover of the control and evaluation device from the sleep mode to the active mode will only be executed in response to an electrical signal generated by the ultrasonic transducer as a result of an extraordinary event of the above-mentioned type.

For the first time, the present invention, in addition to the determination of fluid volume, and thus the consumption of fluid, permits an individual fluid meter, with respect to the occurrence of noise- and or oscillation-generating malfunctions, to be monitored and accurately logged over its entire service life.

Figure 5:
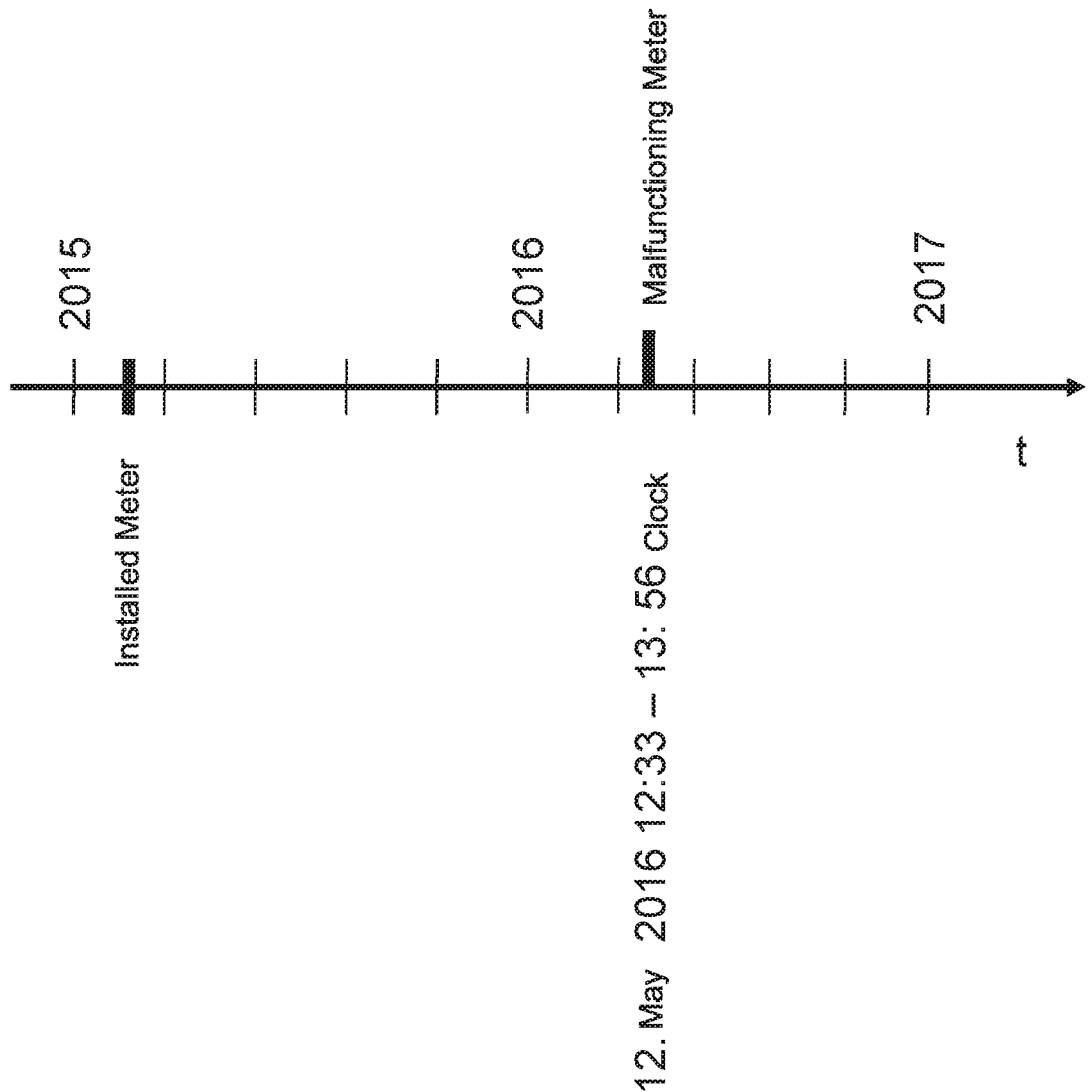
FIG. 5 is an illustration showing a malfunction time record of the fluid meter according to the invention.

An exemplary malfunction record of this type is shown, in a simplified representation, in FIG. 5. In the operating system of the fluid meter, by means of the present invention, a malfunction can be detected, characterized and, if required, correspondingly recorded and analyzed. Additional information which is of particular importance for the operation of the individual fluid meter (operating properly) can thus be delivered as an output to the user or operator of the fluid meter. As a result, incorrect measurements, incorrect operations, inadvertent operations and further adverse impairments of the operation of the fluid meter can be rapidly detected, and remedies provided accordingly. The present invention thus constitutes a highly specific contribution to the relevant field of the prior art.

LIST OF REFERENCE NUMBERS

1 Fluid meter
2 Connection housing
3 Electronic module
4 Display
5 Measuring channel
6a Ultrasonic transducer
6b Ultrasonic transducer
7a Insert
7b Insert
8a Seal
8b Seal
9a Cover
9b Cover
16 Operating system
16a Fluid volume functional module
16b Event chronology functional module
16c Complete event history functional module
16d Event type functional module

The invention claimed is:
1. A method for monitoring an operation of a fluid meter mounted in a fluid-supplying fluid distribution system, the fluid meter having at least one ultrasonic transducer, which comprises the steps of:
selectively detecting and evaluating, by means of the at least one ultrasonic transducer, an event which mechanically excites the at least one ultrasonic transducer and is not attributable to a flow measurement, in a form of a noise generated and associated with the operation of the fluid meter and/or a pressure surge originating from the fluid distribution system;
generating at least one fluid meter-specific operating property by reference to a result of an evaluation;
recording the event which mechanically excites the at least one ultrasonic transducer over a time t;
identifying the event with a time stamp;
recording a total event duration and/or a total event intensity of the selectively detected events over the time t; and generating a device-specific event history by reference to detected events which mechanically excite the at least one ultrasonic transducer over time.

2. The method according to claim 1, wherein the device-specific event history or event information is compared with an empirically determined event characteristic curve and/or event characteristic variables, and an event/damage type classification and/or a control variable and/or regulating variable is deduced from a comparison.

3. The method according to claim 1, wherein in an event of an overshoot of the event duration D and/or of an event intensity I, a warning signal and/or a warning message is generated.

4. The method according to claim 1, wherein a maximum intensity of the pressure surge generated in the pipe system is detected and evaluated.

5. The method according to claim 1, which further comprises:
    operating a control and evaluation device of the fluid meter alternately in an active mode and a sleep mode; and
    configuring the control and evaluation device such that a switchover thereof from the sleep mode to the active mode is only executed in response to an electrical signal generated by the at least one ultrasonic transducer as a result of the event.

6. The method according to claim 1, wherein an electrical signal generated by the at least one ultrasonic transducer in response to the event is generated solely by mechanical energy of the event, with no additional energy.

7. The method according to claim 6, which further comprises selecting the electrical signal from the group consisting of a signal pattern, a frequency spectrum and a maximum level.

8. The method according to claim 1, wherein the at least one ultrasonic transducer for a selective detection and evaluation of the event is a constituent of an ultrasonic transducer assembly for a determination of transit time.

9. The method according to claim 1, wherein the event respectively involves:
    a fluid meter-related cavitation noise; and/or
    a fluid-meter related vibration noise; and/or
    a mechanical stress applied to the at least one ultrasonic transducer by particles which are present in the fluid meter or are flushed through the fluid meter.

10. A fluid meter for a flow measurement in a fluid-supplying fluid distribution system, the fluid meter comprising:
    an ultrasonic transducer assembly for transit time measurement and containing ultrasonic transducers for a transmission and/or reception of ultrasonic waves to a fluid or from the fluid;
    an electronic module having a controller and an operating system for actuation, signal detection and signal evaluation of said ultrasonic transducers;
    an electrical energy source;
    the operating system, in addition to flow measurement, incorporates an additional functional mode; and
    the flow meter, via said ultrasonic transducers, selectively detects and evaluates an event which mechanically excites said ultrasonic transducers and is not attributable to a flow measurement, in a form of a noise generated and associated with the fluid meter and/or a pressure surge originating from the fluid distribution system;
    said controller configured for:
        generating at least one fluid meter-specific operating property with reference to a result of an evaluation;
        recording the event which mechanically excites the at least one ultrasonic transducer over a time t;
        identifying the event with a time stamp;
        recording a total event duration and/or a total event intensity of the selectively detected events over the time t; and
        generating a device-specific event history by reference to detected events which mechanically excite the at least one ultrasonic transducer over time.

11. The fluid meter according to claim 10, wherein an event and/or an occurrence of the event is saved and/or delivered as an output.

12. The fluid meter according to claim 10, further comprising a connection housing, by means of which the flow meter can be installed in a fluid distribution system.

13. The fluid meter according to claim 12, further comprising a measuring insert disposed within said connection housing, and containing a measuring tube, deflection mirrors for an ultrasonic signal and flow guiding devices.

14. The fluid meter according to claim 10, wherein the fluid-supplying fluid distribution system is a water distribution system for a supply of water.

* * * * *